United States Patent
Nah

(10) Patent No.: US 7,974,612 B2
(45) Date of Patent: Jul. 5, 2011

(54) TRANSMISSION OF DATABASE RECORDS BETWEEN MOBILE COMMUNICATION TERMINALS

(75) Inventor: Hyung Jooh Nah, Incheon-si (KR)

(73) Assignee: LG Electronics Inc., Seoul (KR)

( * ) Notice: Subject to any disclaimer, the term of this patent is extended or adjusted under 35 U.S.C. 154(b) by 494 days.

(21) Appl. No.: 11/557,187

(22) Filed: Nov. 7, 2006

(65) Prior Publication Data

US 2007/0173241 A1    Jul. 26, 2007

(30) Foreign Application Priority Data

Jan. 25, 2006  (KR) ........................ 10-2006-0007711

(51) Int. Cl.
*H04M 3/00* (2006.01)
*H04W 4/00* (2009.01)
*H04M 1/00* (2006.01)
*G09G 5/08* (2006.01)

(52) U.S. Cl. ......... 455/418; 455/466; 455/564; 345/168

(58) Field of Classification Search .................. 455/418, 455/425, 564, 466; 345/300, 168
See application file for complete search history.

(56) References Cited

U.S. PATENT DOCUMENTS

| | | | |
|---|---|---|---|
| 6,370,389 B1 * | 4/2002 | Isomursu et al. | 455/466 |
| 6,496,693 B1 * | 12/2002 | Tran | 455/426.1 |
| 2002/0187815 A1 * | 12/2002 | Deeds et al. | 455/564 |
| 2003/0078033 A1 * | 4/2003 | Sauer et al. | 455/412 |
| 2003/0095107 A1 * | 5/2003 | Griffin et al. | 345/168 |
| 2003/0130864 A1 * | 7/2003 | Ho et al. | 705/1 |
| 2004/0242216 A1 * | 12/2004 | Boutsikakis | 455/418 |
| 2005/0079861 A1 | 4/2005 | Lim | |

FOREIGN PATENT DOCUMENTS

| | | |
|---|---|---|
| DE | 197 37 126 A1 | 3/1999 |
| EP | 1024674 A1 | 8/2000 |
| JP | 10-155038 | 6/1998 |
| JP | 2002-209009 | 7/2002 |
| JP | 2003-037871 | 2/2003 |
| JP | 2004-282195 | 10/2004 |
| JP | 2004-289408 | 10/2004 |
| WO | WO 99-29127 | 6/1999 |
| WO | 2004/098165 | 11/2004 |
| WO | WO 2005-027469 A1 | 3/2005 |

OTHER PUBLICATIONS

"Method for transmitting and receiving phone book content as short message service in mobile communication terminal" Dewent, Jun. 28, 2002, XP002290689 *abstract*.

* cited by examiner

*Primary Examiner* — Kent Chang
*Assistant Examiner* — Manpreet S Matharu
(74) *Attorney, Agent, or Firm* — Lee, Hong, Degerman, Kang & Waimey

(57) ABSTRACT

A method for transmitting a phone number stored in a first mobile communication terminal to a second mobile communication terminal is provided. The method comprises selecting a phone number stored in a database in the first mobile communication terminal, by way of interacting with a user interface of the first mobile communication terminal; creating a short text message to be transmitted to the second mobile communication terminal; inputting the selected phone number in the short text message, as a single entry, by way of interacting with the user interface of the first mobile communication terminal; and transmitting the short text message to the second mobile communication terminal, wherein a user of the second mobile communication terminal upon receipt of the short text message interacts with the second mobile communication terminal to select the phone number in the short text message, as a single entry.

33 Claims, 9 Drawing Sheets

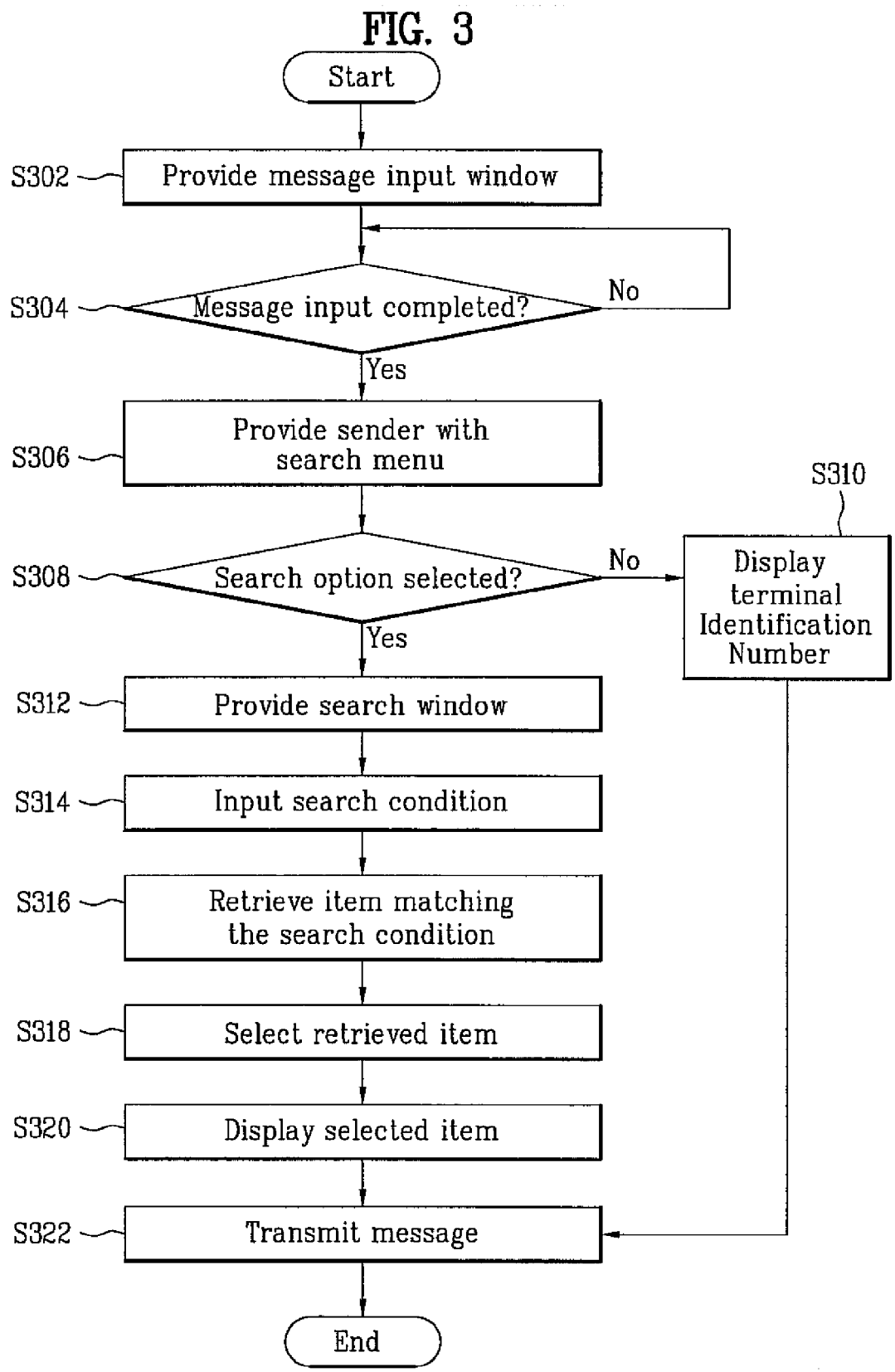

TRANSMISSION OF DATABASE RECORDS BETWEEN MOBILE COMMUNICATION TERMINALS

CROSS REFERENCE TO RELATED APPLICATIONS

This application claims priority to and the benefit of the Korean Patent Application No. 10-2006-0007711, filed on Jan. 25, 2006, which is hereby incorporated by reference as if fully set forth herein.

FIELD OF THE INVENTION

The present invention relates to a method of transmitting a message, and more particularly, to a method of transmitting a message to deliver personal information stored in a first mobile communication terminal to a second mobile communication terminal.

BACKGROUND

Telephone numbers and other contact or date information can be stored in a mobile communication terminal. That is, a database having several data records may be implemented so that personal information for a contact or calendar item can be stored in the mobile communication terminal. This information can be later recalled by a user.

Currently, there is no convenient method of sharing the information stored in the database records. For example, typically, a person will have to verbally notify another person about the information or manually handwrite the needed data. The other user will then have to then manually enter the related data into his mobile communication terminal.

Methods and systems are needed that can provide a more convenient alternative to the manual method of transferring data between mobile communication terminals.

SUMMARY OF THE INVENTION

Accordingly, the present invention is directed to a system for transmitting a message that substantially obviates one or more problems due to limitations and disadvantages of the related art. An object of the present invention is to provide a system and method for easily transmitting personal information stored in a mobile communication terminal. Another object of the present invention is to provide a system and method to make it easier for a recipient of a text message to store personal information that is received by her mobile communication terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting a message according to the present invention comprises selecting a phone number stored in a database in the first mobile communication terminal, by way of interacting with a user interface of the first mobile communication terminal, creating a text message to be transmitted to the second mobile communication terminal, inputting the selected phone number in the text message, as a single entry, by way of interacting with the user interface of the first mobile communication terminal, and transmitting the text message to the second mobile communication terminal.

In accordance with another embodiment, a system for transmitting a message from a first mobile communication terminal comprises a logic unit for selecting first data in a first format from a first database by way of interacting with a first user interface of the first mobile communication terminal, a logic unit for associating the first data to a first message created by a user of the first mobile communication terminal, and a logic unit for transmitting the first data to a second mobile communication terminal in association with the first message, wherein the second mobile communication terminal is used to extract the first data in the first format from the first message, upon receiving the first message.

In accordance with yet another embodiment, a method for transmitting a phone number stored in a first mobile communication terminal to a second mobile communication terminal is provided. The method comprises selecting a phone number stored in a database in the first mobile communication terminal, by way of interacting with a user interface of the first mobile communication terminal; creating a short text message to be transmitted to the second mobile communication terminal; inputting the selected phone number in the short text message, as a single entry, by way of interacting with the user interface of the first mobile communication terminal; and transmitting the short text message to the second mobile communication terminal.

A user of the second mobile communication terminal upon receipt of the short text message interacts with the second mobile communication terminal to select the phone number in the short text message, as a single entry. Selecting the phone number causes the second mobile communication terminal to generate a reply.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 3 is a flowchart of a method for transmitting a message by displaying a phone number obtained from a digital phonebook according to another embodiment.

DETAILED DESCRIPTION OF THE PREFERRED EMBODIMENTS

In the following, certain embodiments of the invention are described by way of example as applicable to various messaging services such as the SMS (short message service), LMS (long message service), MMS (multi-message service). It is noteworthy that the invention in alternative embodiments may be implemented over other messaging services that support delivery of text or audiovisual content in an electronic message.

In the following the term 'sender information' refers to information associated with a person who sends a message from a first mobile communication terminal to a second mobile communication terminal. This information can include an e-mail address, a uniform resource locator (URL), or a phone number.

The term 'personal information' refers to information stored in an electronic or digital database, such as a phonebook, calendar, or other digital database for recording personal data, and comprises at least one of a phone number, an e-mail address, a URL, a date, or other category of data records that can be stored in a personal digital assistant (e.g., tasks, calendar, contacts, notes, etc.)

Figure 1:
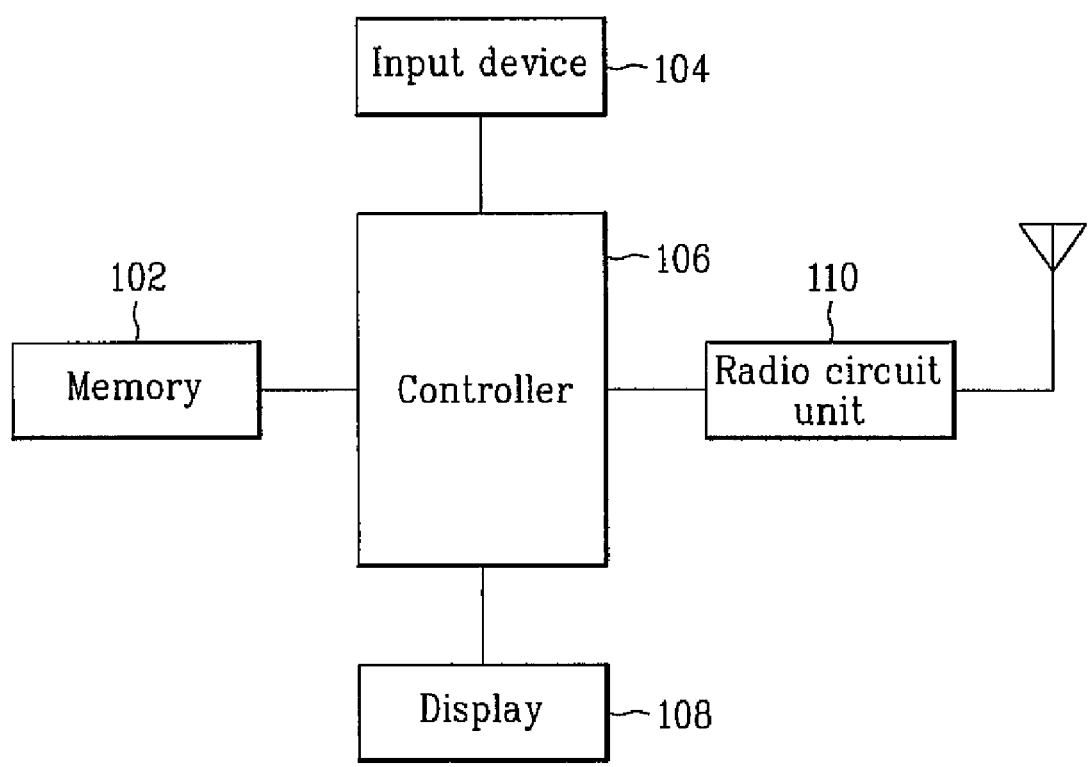
FIG. 1 is a block diagram illustrating the components of a mobile communication terminal, according to an exemplary embodiment.
Figure 2:
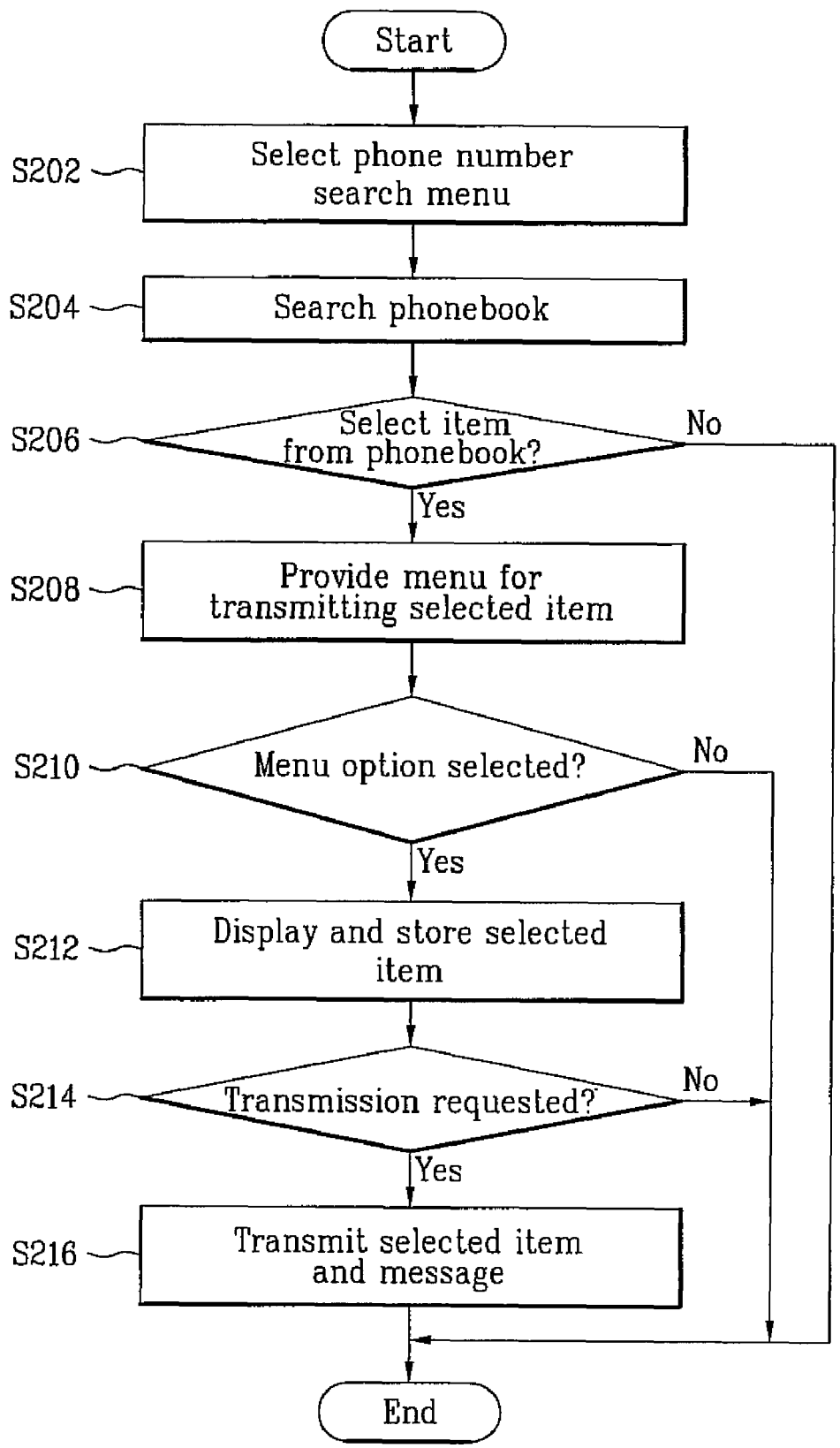
FIG. 2 is a flowchart of a method for transmitting a message by displaying a phone number obtained from a digital phonebook according to one embodiment.

Referring to FIG. 1, a mobile communication terminal, in accordance with one aspect of the invention, comprises a memory 102, an input device 104, a controller 106, a display 108, and a radio circuit unit 110. A software program for controlling the overall operation of the mobile communication terminal is loaded in the memory 102. Personal information such as contact phone numbers, e-mail addresses, and URLs are also stored in the memory 102 according to one embodiment.

Preferably, the memory 102 includes a phonebook storage unit to store personal information. The input device 104 is provided with a plurality of keys to allow a user input data into the mobile communication terminal. The input device 104 can be implemented as a keyboard, keypad, a joystick, a pointer device, a touch-screen or other alternative interactive mechanism available for inputting data to a mobile communication terminal. A user can use the input device 104 to submit search queries to find one or more personal information recorded in the mobile communication terminal's database.

The display 108 may comprise a liquid crystal display for displaying various information and content. Various information such as date, time, mode and other user information may be displayed on display 108, in response to a user request. Personal information matching the user request may be displayed on the display 108 of the mobile communication terminal, according to one embodiment.

The radio circuit unit 110 is a transceiver for wirelessly communicating voice, data and control information with a base station. The radio circuit unit 110 communicates with an external mobile communication terminal by way of a base station. The controller 106 controls the overall operation of the mobile communication terminal. The controller 106 may comprise arithmetic and logic units, a register, a program counter, a command decoder, a control circuit and the like.

The controller 106 according to one embodiment can be used to search and retrieve information from a contacts, calendar or phonebook database stored in the mobile communication terminal (e.g., in memory 102). The information may include a person's name, contact information, a calendar item, etc. The information can be transmitted in a message to the mobile communication network via the radio circuit unit 110. The search can be performed, for example, by entering a partial keyword for the item being searched.

For example, if a user attempts to search personal information of "Steve Dean," a whole name "Steve Dean" or "Steve" can be inputted. In this case, the controller 106 can obtain personal information associated with the name "Steve" from the phonebook database stored in the memory 102. Alternatively, a reverse search may be performed by entering a phone number as the keyword to retrieve records in the phonebook database associated with the searched phone number.

In one embodiment, the controller 106 controls a message to be transmitted by displaying the personal information selected from the obtained personal information by the user as sender information. Moreover, the controller 106 is able to transmit a message by displaying personal information, which is obtained in case that a user selects an item for transmitting personal information from a menu including the item for transmitting personal information, as sender information.

Furthermore, the controller may transmit a message by representing the obtained personal information as sender information and inputting the obtained sender information as message contents automatically. For example, if a phone number of Steve Dean is selected from the obtained personal information and if the phone number is 019-XXXX-YYYY, "Steve Dean's phone number, 019-XXXX-YYYY" is inputted as a message content to be transmitted together with sender information. If Steve Dean's e-mail is selected from the obtained personal information and if an e-mail address sss@hhh.com, is Steve Dean's e-mail, then "sss@hhh.com" is inputted as a message content to be transmitted together with sender information.

In one embodiment, message contents other than the phone number can be retrieved. In one embodiment, if a user can transmit, for example, a message comprising "It's me, Steve's phone number is 0000-00000-0000", as provided in more detail below, by performing a search for Steve's number and automatically entering that number into a message, without having to key in the phone number into the message.

The controller 106 of the mobile communication terminal according to another embodiment of the present invention can display a sender information input window on the display 108 to provide a menu including a search item. If a user selects one of the search item and inputs a search condition, the controller 106 obtains personal information matched to the search condition from the phonebook and represents it as sender information.

The controller 106, in one embodiment, transmits a message to a mobile communication network via the radio circuit unit 110. In this case, the search condition may include a part of name, a whole name or a part of a phone number. Preferably, the controller 106 can represent the obtained personal information as sender information and input the obtained personal information as message contents automatically.

A process for transmitting a message including a phone number retrieved from a phonebook according to an embodiment of the present invention is explained in detail with reference to FIG. 2 and FIGS. 4A to 4D. It should be noted that a phone number is used as an example. In alternative embodiments, a message can include an e-mail address, a URL or other sender information.

Figure 4A:
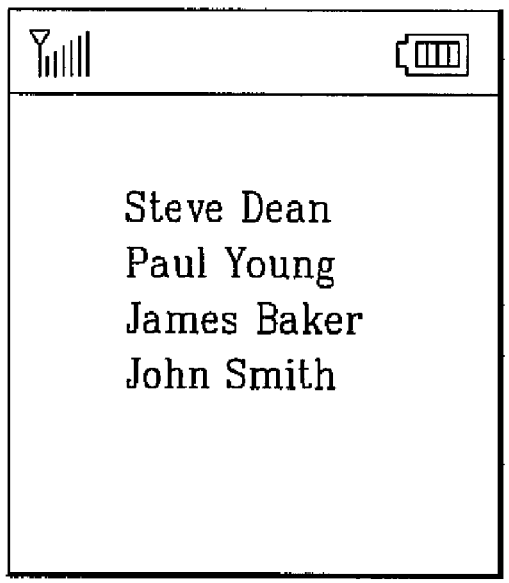
FIGS. 4A to 4D are exemplary diagrams illustrating the display content and features of the mobile communication terminal of FIG. 1, according to an exemplary embodiment.

Referring to FIG. 2 and FIGS. 4A to 4D, a user selects a phone number search menu (S202). In response, a search window is displayed on the display 108 to enable a user to input a search condition (e.g., a search string including a part of a phone number). In response to the inputted search condition, the phonebook records are searched for a match (S204). A list of phone numbers or names matching the search condition, as shown in FIG. 4A, are then retrieved and displayed.

The user can then select from the list (S206). For example, the user can select from the list a phone number, an e-mail address or a URL, depending on the matches displayed for the search condition. In certain embodiment, one or more items may be selected from the list.

Figure 4B:
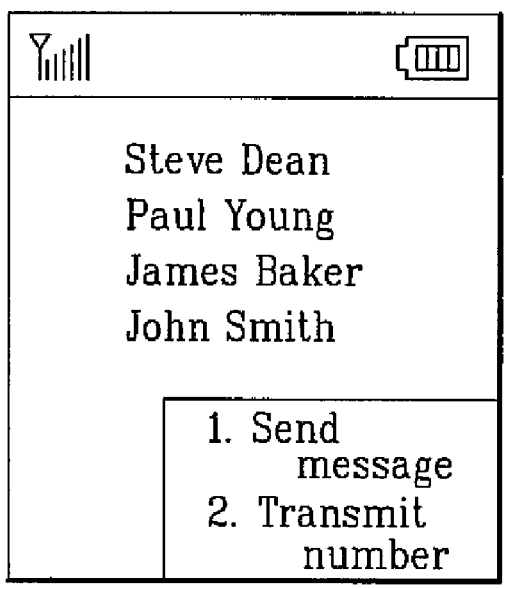

Preferably, after one or more items are selected, a menu for transmitting the selected items is provided (S208). In one embodiment, the menu including the item for transmitting personal information can be provided regardless of whether the user has selected an item from the list. An exemplary menu for transmitting the selected information, is shown in FIG. 4B, providing a user with options to send a message or transmit a selected item.

Figure 4C:
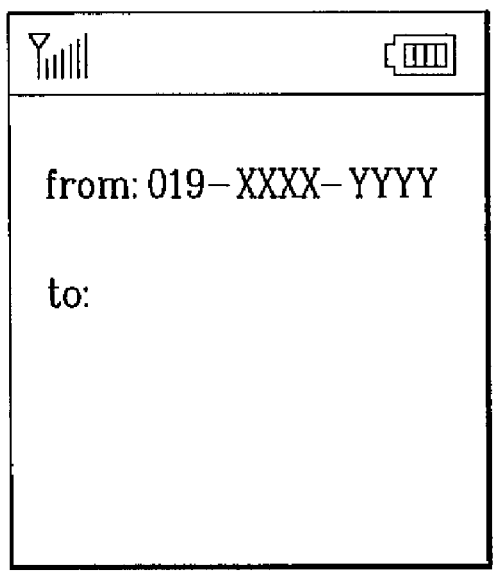

It is then determined if a user has selected a menu option (S210). If the user opts to transmit the selected item (e.g., a phone number), then the selected phone number is displayed on display 108 and is preferably stored in memory 102 (S212). For example, if a phone number "019-XXXX-YYYY" was selected, as shown in FIG. 4C, that phone number will be placed in a message to be transmitted. In one embodiment, the selected phone number can be included as sender's information, for example.

Figure 4D:
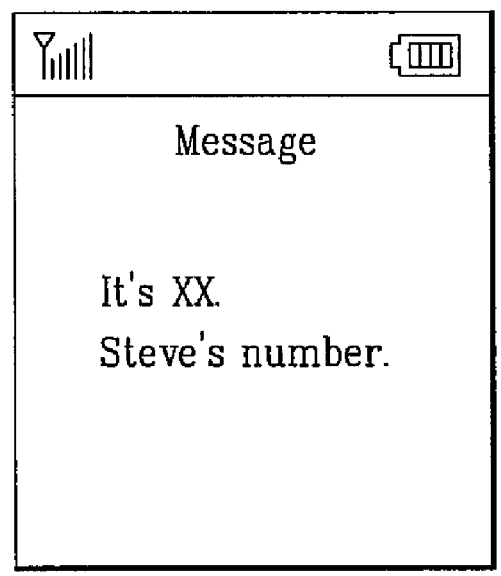

In an exemplary embodiment, the selected item is displayed in a section of the message associated with the sender's phone number. In other exemplary embodiments, the selected item may be displayed in other sections of the message that are associated with the receiver's phone number, for example. If the user requests to transmit the message (S214) the message including the selected item is transmitted to a receiving party (S216). An exemplarily SMS message (e.g., "It's XX, Steve's number.") is illustrated in FIG. 4D.

In some embodiments, the item is first selected from a database and then a message is edited by a user. Alternatively, in other embodiment, first a message may be edited by the user and then the item may be selected from a database.

In accordance with another embodiment, a method for transmitting a message including a phone number retrieved from a phonebook is provided in with reference to FIG. 3 and FIGS. 5A to 5D. Again, a phone number is used as an example in the following. One of ordinary skill in the art would understand that instead of a phone number other personal data such an e-mail address, a URL or the like may be transmitted.

Figure 5A:
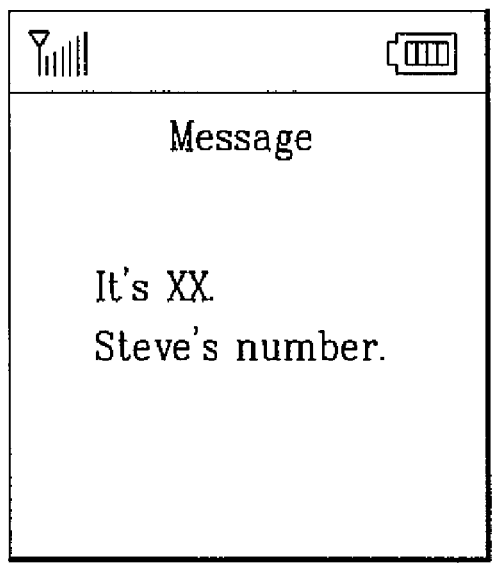
FIGS. 5A to 5D are exemplary diagrams illustrating the display content and features of mobile communication terminal of FIG. 11 according to another exemplary embodiment.
Figure 5B:
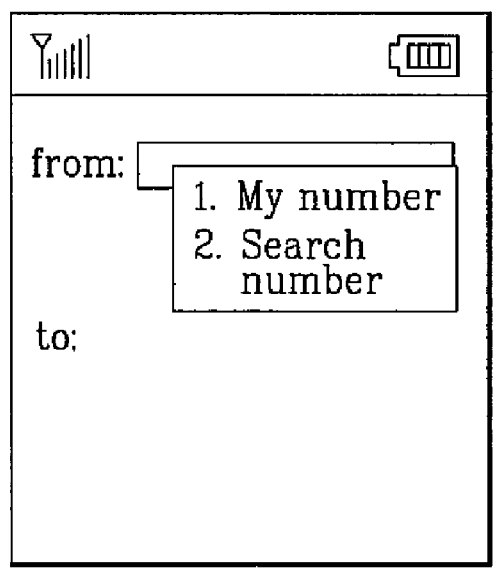

Referring to FIG. 3 and FIGS. 5A to 5D, a message input window is provided to a user for composing a message (S302). Referring to FIG. 5A, in an exemplary embodiment, the user inputs a message "It's XX, Steve's number." The user may press a confirm key, an OK key or the like to indicate that composing the message has been completed. Referring to FIG. 5B, in one embodiment, after the user completes composing the message (S304), the user is provided with a search menu for searching a database for one or more items (e.g., a phone number, an address, an email, etc.) to be included in the message (S30).

If the user does not select a search option (S308), then in the section of the message associated with the sender information, the sending terminal's identification number is displayed (S310), otherwise, a search window is provided to the user for entering one or more search keywords or search conditions (S312, S314).

Figure 5C:
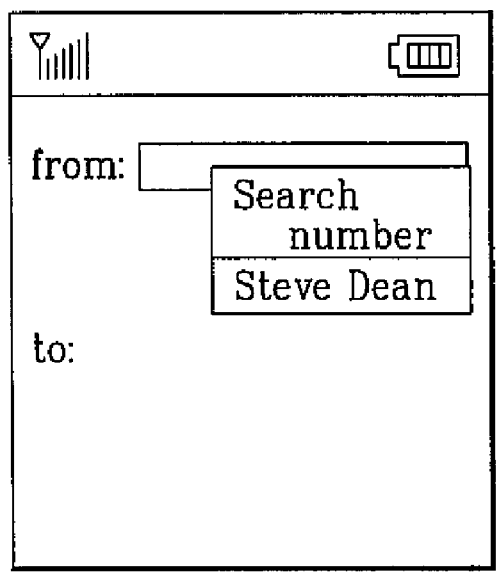

Thereafter, one or more items matching the search condition are retrieved from a respective database (e.g. phonebook) and are displayed on the display 108 (S316). Referring to FIG. 5C, for example, if a name "Steven Dean" or an associated phone number is retrieved, as the result of the search, the user can interact with a provided menu to select the retrieved item (S318) to be included in the composed message.

Figure 5D:
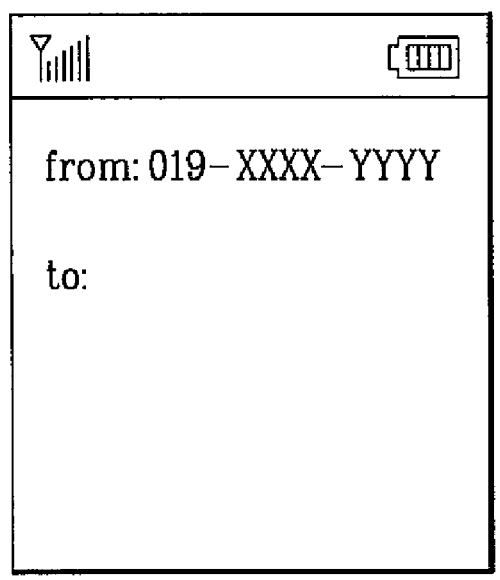

In one embodiment, once the user selects the retrieved item, the selected item is displayed and included in the message (S320). In an exemplary embodiment, a phone number "019-XXXX-YYYY," as shown in FIG. 5D, is included in a portion of the message associated with the sender's phone number, As noted earlier, the selected item may be included in other portions of the message (e.g., message body, message header, message sender information, message receiver information, etc.). After having selected the retrieved item, the user presses a "Confirm," "OK" or other key to transmit the message, including the selected item (S322). The above noted steps may be performed in any order depending on implementation. Thus, the order of steps disclosed above should not be construed as limiting the scope of the invention to a particular order.

FIGS. 6A to 6D are exemplary diagrams of images displayed on a display of a mobile communication terminal, according to one embodiment, when a message including a selected is received.

Figure 6A:
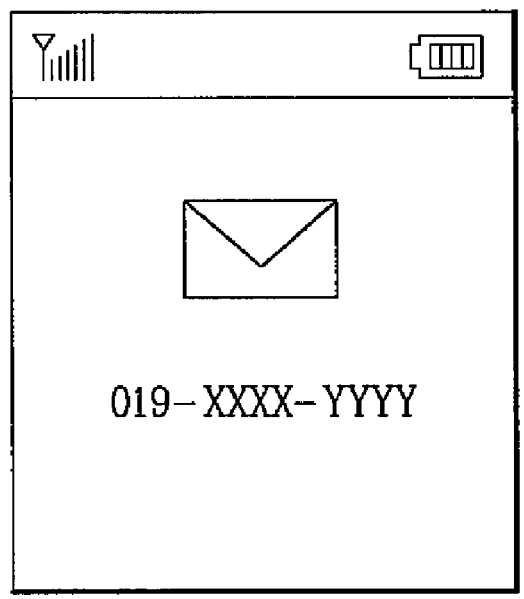
FIGS. 6A to 6D are exemplary diagrams of images displayed on a mobile communication terminal receiving a message according to one embodiment.
Figure 6B:
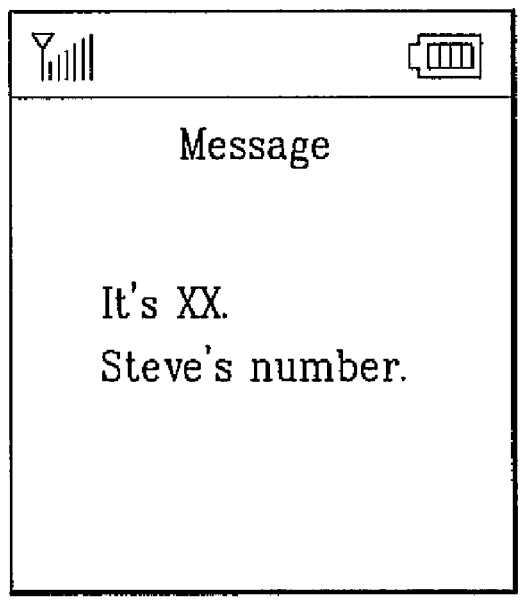

As shown, once a message is received (FIG. 6A), the user can interact with the mobile terminal to open the message. Once the message is opened, the content of the message is displayed along with the transmitted item (FIG. 6B). The user will be able to then interact with the mobile terminal to select from a menu of options, wherein a first menu option will allow the user to select the transmitted item and store it in the mobile terminal. For example, if the item is a telephone number, the user can store the telephone number directly into the phonebook database of the mobile terminal (e.g., see FIG. 6C option 2).

Figure 6C:
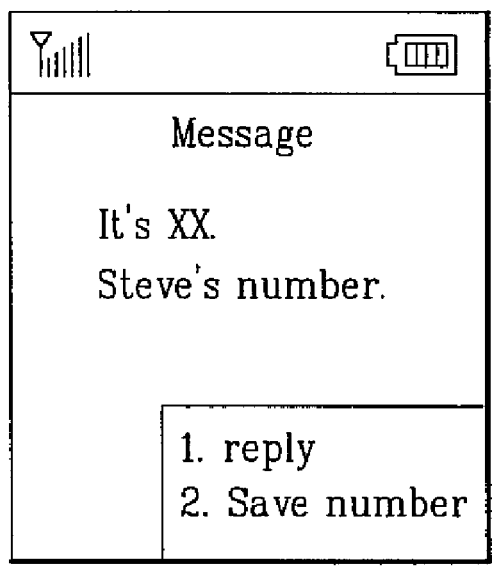
Figure 6D:
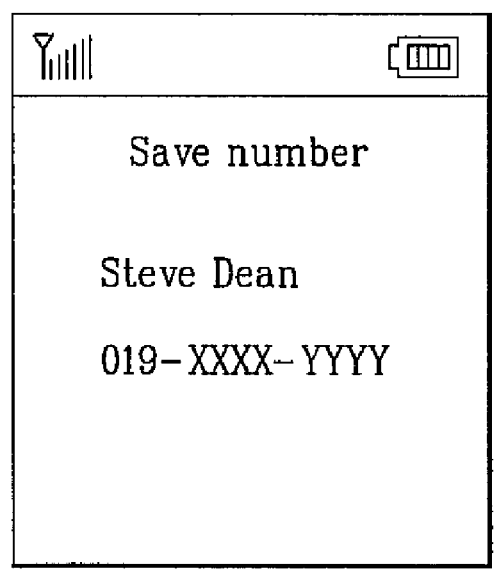

Alternatively, the user may select a second option, which will allow the user to provide a reply (e.g., see FIG. 6C option 1). Depending on implementation and on the type of item included in the message the reply may result in a telephone call (e.g., if the item is a phone number), a text message (e.g., if the item is an email address), opening a browser window (e.g., if the item is a URL) or other reply corresponding to the item included in the message.

Accordingly, if for example, the item is a phone number, a sender can conveniently inform a third party of a specific phone number without memorizing a phone number stored in a phonebook or writing down the phone number to input to a message. Further, the present invention enables the recipient to directly make a phone call to the included phone number or store the phone number without having to key in the phone number.

Or if the item is an e-mail or a URL, the recipient after receiving the message can send an e-mail directly to the email address or access the URL page in the message without having to key in the URL address or the email address manually. In a similar manner, a SMS may be composed and transmitted in reply to a message that includes a phone number, for example.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting a phone number stored in a first mobile communication terminal to a second mobile communication terminal, the method comprising:
    providing a message window for receiving a composed message to be transmitted to the second mobile communication terminal;
    receiving a search query for searching a specific phone number to be transmitted, the search query comprising a search string;
    searching for at least one phone number stored in a database in the first mobile communication terminal in response to the search query;
    displaying the searched at least one phone number;
    selecting the specific phone number from the searched at least one phone number by way of interacting with a user interface of the first mobile communication terminal, the selected specific phone number being a phone number of a specific third party that is not the first or second mobile communication terminal;
    displaying the selected specific phone number corresponding to the third party in a sender information section included in the message window by way of interacting with the user interface of the first mobile communication terminal such that the selected specific phone number represents sender information of the message; and
    transmitting the message to the second mobile communication terminal, wherein default sender information of the first mobile communication terminal is replaced by the selected specific phone number in the sender information section of the transmitted message such that the second mobile communication terminal retrieves the phone number directly from the sender information section in the message upon receiving the message from the first mobile communication terminal.

2. The method of claim 1, wherein the second mobile communication terminal is configured to dial the retrieved specific phone number or to generate a reply message to be sent to the retrieved specific phone number to communicate with the third part by directly replying to the received from the first mobile communication terminal.

3. The method of claim 1, wherein the second mobile communication terminal is configured to store the retrieved specific phone number corresponding to the third party in a database in the second mobile communication terminal.

4. The method of claim 1, wherein the message window further comprises a body section for entering text in addition to the sender information section, wherein the selected specific phone number is also included in the body section.

5. A method for transmitting data stored in a first database of a first mobile communication terminal, the method comprising:
    displaying a message window for receiving a composed message to be transmitted to a second mobile communication terminal;
    receiving a search query for searching a specific phone number to be transmitted, the search query comprising a search string;
    searching at least one phone number stored in the first database in response to the search query;
    displaying the searched at least one phone number;
    selecting the specific phone number from the searched at least one phone number by way of interacting with a first user interface of the first mobile communication terminal, the selected specific phone number being a phone number of a specific third party that is not the first or second mobile communication terminal;
    associating the selected specific phone number with a sender information section included in the message window, the selected specific phone number corresponding to the third party included in the sender information section instead of a phone number corresponding to the first mobile communication terminal; and
    transmitting the message to the second mobile communication terminal, wherein default sender information of the first mobile communication terminal is replaced by the selected specific phone number in the sender information section of the transmitted message,
    wherein the second communication terminal stores the specific phone number stored in the sender information section of the received message or establishes a connection with the specific phone number stored in the sender information section of the received message by retrieving the specific phone number directly from the sender information section in the message, the second mobile communication terminal generating a reply message to be sent to the specific phone number by directly replying to the message received from the first mobile communication terminal or dialing the first phone number while establishing the connection.

6. A first mobile communication terminal configured to transmit data stored in a first database of the first mobile communication terminal, the first mobile communication terminal comprising:
    a logic unit for providing a message window for creating a message to be transmitted to a second mobile communication terminal;
    an input unit for receiving a search query for searching a specific phone number to be transmitted, the search query comprising a search string;
    a logic unit for searching at least one phone number stored in the first database in response to the search query;
    a display unit for displaying the searched at least one phone number;
    a logic unit for selecting the specific phone number from the searched at least one phone number by way of interacting with a first user interface of the first mobile communication terminal, the selected specific phone number being a phone number of a specific third party that is not the first or second mobile communication terminal;
    a logic unit for associating the selected specific phone number with a sender information section included in the message window; and
    a logic unit for transmitting the created message to the second mobile communication terminal, wherein default sender information of the first mobile communication terminal is replaced by the selected specific phone number in the sender information section of the transmitted message such that the second mobile communication terminal retrieves the specific phone number directly from the sender information section in the message upon receiving the message from the first mobile communication terminal.

7. The first mobile communication terminal of claim 6, wherein the second mobile communication terminal is configured to dial the specific phone number in response to an input for directly selecting the phone number in the sender information section of the received message.

8. The first mobile communication terminal of claim 6, wherein the second mobile communication terminal is configured to generate a reply message to be sent to the specific phone number in response to an input for directly replying to the received message.

9. A method for transmitting a phone number stored in a first mobile communication terminal to a second mobile communication terminal, the method comprising:
    selecting the phone number stored in a database in the first mobile communication terminal, by way of interacting with a user interface of the first mobile communication terminal, wherein the selected phone number is a specific phone number corresponding to a third party that is not the first or second mobile communication terminal;
    providing a menu for transmitting the selected phone number;
    providing a message widow for receiving a composed message to be transmitted to the second mobile communication terminal when the provided menu is selected;
    displaying the selected phone number in a sender information section included in the message window;
    receiving the message to be transmitted to the second mobile communication terminal; and
    transmitting the received message to the second mobile communication terminal,
    wherein default sender information of the first mobile communication terminal is replaced by the selected phone number in the sender information section of the message received by the second mobile communication terminal such that the second mobile communication terminal retrieves the phone number directly from the sender information section in the message upon receiving the message from the first mobile communication terminal.

10. The method of claim 9, wherein selecting the phone number stored in the database in the first mobile communication terminal comprises:
    receiving at least partial information related to the phone number;
    activating a phone number search option;
    displaying a list of at least one phone number that matches the at least partial information; and
    receiving an input for selecting the phone number from the list.

11. The method of claim 1, wherein the message is transmitted from the first mobile communication terminal to the second mobile communication terminal by a messaging service via a mobile communication network.

12. The method of claim 11, wherein the mobile communication network comprises a base station and the message is transmitted from the first mobile communication terminal to the second mobile communication terminal via the base station.

13. The method of claim 11, wherein the messaging service comprises a short message service (SMS), a long message service (LMS), or a multi-message service (MMS).

14. The method of claim 5, wherein the message is transmitted from the first mobile communication terminal to the second mobile communication terminal by a messaging service via a mobile communication network.

15. The method of claim 14, wherein the mobile communication network comprises a base station and the message is transmitted from the first mobile communication terminal to the second mobile communication terminal via the base station.

16. The method of claim 14, wherein the messaging service comprises a short message service (SMS), a long message service (LMS), or a multi-message service (MMS).

17. The first mobile communication terminal of claim 6, wherein the message is transmitted from the first mobile communication terminal to the second mobile communication terminal by a messaging service via a mobile communication network.

18. The first mobile communication terminal of claim 17, wherein the mobile communication network comprises a base station and the message is transmitted from the first mobile communication terminal to the second mobile communication terminal via the base station.

19. The first mobile communication terminal of claim 17, wherein the messaging service comprises a short message service (SMS), a long message service (LMS), or a multi-message service (MMS).

20. The method of claim 9, wherein the message is transmitted from the first mobile communication terminal to the second mobile communication terminal by a messaging service via a mobile communication network.

21. The method of claim 20, wherein the mobile communication network comprises a base station and the message is transmitted from the first mobile communication terminal to the second mobile communication terminal via the base station.

22. The method of claim 20, wherein the messaging service comprises a short message service (SMS), a long message service (LMS), or a multi-message service (MMS).

23. A second mobile communication terminal configured to receive data from a first mobile communication terminal, the second mobile communication terminal comprising:
    a transceiver configured to receive a message from the first mobile communication terminal, the message comprising at least a sender information section and a body section, wherein default sender information of the first mobile communication terminal is replaced by the data related to contact information of a specific third party in the sender information section;
    a display configured to display the received message, the data including the contact information of the specific third party being displayed in the sender information section of the received message;
    an input unit configured to receive an input for selecting the contact information included in the displayed message and for directly contacting the specific third party utilizing the selected contact information;
    a memory configured to store the data included in the received message; and
    a controller configured to contact the specific third party via the transceiver in response to the input such that no manual entry of the contact information needs to be received by the second mobile communication terminal to contact the specific third party,
    wherein the contact information comprises a specific phone number, a specific email address, or a specific uniform resource locator (URL) corresponding to the specific third party.

24. The method of claim 1, further comprising:
    providing an options menu for:
        displaying the selected specific phone number in the sender information section of the message, or
        displaying the selected specific phone number in a message body section of the message; and
    receiving an input for selecting displaying the selected specific phone number in the sender information section of the message via the options menu.

25. The method of claim 1, further comprising:
    providing an options menu for:
        displaying a phone number of the first mobile communication terminal in the sender information section of the message, or displaying the selected specific phone number corresponding to the third party in the sender information section of the message; and receiving an input for selecting displaying the selected specific phone number corresponding to the third party in the sender information section of the message via the options menu.

26. The method of claim 1, wherein the search string comprises at least a part of the specific phone number or a name corresponding to the third party.

27. The method of claim 1, further comprising:
providing a search menu for receiving the search query;
receiving an input for selecting the search menu; and
displaying a search window receiving the search query.

28. The method of claim 5, further comprising:
providing an options menu for:
  displaying the selected specific phone number in the sender information section of the message, or
  displaying the selected specific phone number in a message body section of the message; and
receiving an input for selecting displaying the selected specific phone number in the sender information section of the message via the options menu.

29. The method of claim 5, further comprising:
providing an options menu for:
  displaying a phone number of the first mobile communication terminal in the sender information section of the message, or
  displaying the selected specific phone number corresponding to the third party in the sender information section of the message; and
receiving an input for selecting displaying the selected specific phone number corresponding to the third party in the sender information section of the message via the options menu.

30. The first mobile communication terminal of claim 6, further configured to:
provide an options menu for:
  displaying the selected specific phone number in the sender information section of the message, or
  displaying the selected specific phone number in a message body section of the message; and
receive an input for selecting displaying the selected specific phone number in the sender information section of the message via the options menu.

31. The first mobile communication terminal of claim 6, further configured to:
provide an options menu for:
  displaying a phone number of the first mobile communication terminal in the sender information section of the message, or
  displaying the selected specific phone number corresponding to the third party in the sender information section of the message; and
receive an input for selecting displaying the selected specific phone number corresponding to the third party in the sender information section of the message via the options menu.

32. The method of claim 9, further comprising:
providing an options menu for:
  displaying the selected specific phone number in the sender information section of the message, or
  displaying the selected specific phone number in a message body section of the message; and
receiving an input for selecting displaying the selected specific phone number in the sender information section of the message via the options menu.

33. The method of claim 9, further comprising:
providing an options menu for:
  displaying a phone number of the first mobile communication terminal in the sender information section of the message, or
  displaying the selected specific phone number corresponding to the third party in the sender information section of the message; and
receiving an input for selecting displaying the selected specific phone number corresponding to the third party in the sender information section of the message via the options menu.

* * * * *